June 12, 1962     J. ROSENBERG     3,038,831
INSULATED ELECTRICAL CONDUCTORS AND COILS
Filed May 15, 1958
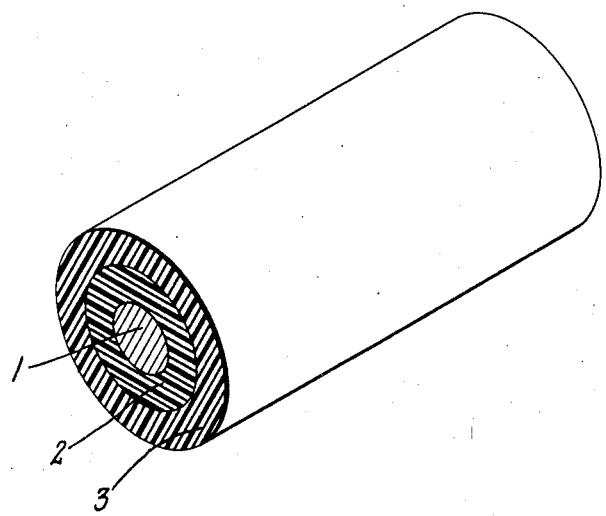
Inventor
Joseph Rosenberg
by
His Attorney

United States Patent Office 3,038,831
Patented June 12, 1962

3,038,831
INSULATED ELECTRICAL CONDUCTORS AND COILS
Joseph Rosenberg, Erie, Pa., assignor to General Electric Company, a corporation of New York
Filed May 15, 1958, Ser. No. 735,562
7 Claims. (Cl. 156—175)

This invention relates to the production of coils from resin-coated magnet wire. More particularly, it relates to the ready production of superior coils using particular solventless adhesives in conjunction with wire coated with high-temperature resistant polyester resins.

The constant search for magnet wire enamels of improved heat resistance along with other desirable physical properties such as abrasion resistance, crack and craze resistance, flexibility, ease of application, low bulk as compared to insulating qualities, short cure time, etc. has led to the discovery of polyester type resins which have very desirable heat resistance along with other favorable physical characteristics, including those noted above. Among such polyester resins or materials are those described in copending application Serial No. 474,624, filed December 10, 1954, now Patent 2,936,296, issued May 10, 1960, and assigned to the same assignee as the present application.

The introduction of magnet wire enamels such as that above has in turn led to the need for new materials for use in fabricating magnet wire so coated into unitary coils which have characteristics consonant with those of the polyester wire enamel and which are compatible therewith. A usual well-known means of forming such coils is to wind the enameled wire into the desired coil shape and then to impregnate the coil and its interstices with a resinous material, often using a vacuum treatment to insure as complete impregnation as possible. In an attempt to avoid the relatively complicated coil impregnating procedure, resort has been made to treating the enameled magnet wire with an adhesive-like compatible resin material and thereafter forming the wire into coil shapes and curing. This procedure, too, has its attendant disadvantages. For example, when a solvent is used in conjunction with the adhesive resin, if such solvent is trapped within the resin between the coil turns, the wire enamel itself may be degraded by the solvent material during curing of the adhesive. If the solvent escapes, it often leaves voids or passages which detract from the electrical characteristics of the finished coil. It is thus best to use as an adhesive material one which is solventless in nature. A further desirable characteristic of the adhesive is that it should have sufficient precure strength so that coils wound therefrom may be removed from the forming mandrel before actual cure of the bonding material. This elimiates the need for many coil forms. Still another desirable feature of an adhesive for forming such coils is that it have a reasonably long pot life.

A principal object of the invention is to provide improved electrical coils made from particular polyester coated magnet wire and a compatible adhesive or bonding material.

A further object of the invention is to provide means for producing such coils wherein the coils are self-supporting before actual cure of the bonding material.

Briefly, the invention comprises electrical coils and means for producing them, wherein a solventless epoxy resin-$BF_3$ amine complex material is used to bond together magnet wire turns coated with certain polyester compositions.

Those features of the invention which are believed to be novel are set forth with particularity in the claims appended hereto. The invention will, however, be better understood and further advantages and objects thereof appreciated from a consideration of the following description and the drawing, in which the single FIGURE shows a conductor coated with the materials of this invention.

Typical of the wire enamels with which the bonding material of this invention is concerned are those described in the above copending application which is included herein by reference. Briefly, the polyester resin comprises (a) from about 25 to 56 equivalent percent, preferably from 36 to 50 equivalent percent, of a lower dialkyl ester of a member selected from the class consisting of isophthalic acid and terephthalic acid and mixtures thereof, (b) from about 15 to 46 equivalent percent, and preferably from 25 to 40 equivalent percent of ethylene glycol, and (c) from about 13 to 44 equivalent percent, and preferably from 20 to 32 equivalent percent of a saturated aliphatic polyhydric alcohol having at least three hydroxyl groups. Typical of the isophthalic and terephthalic acid esters which may be used are those dialkyl esters containing from 1 to 8 and preferably from 1 to 4 carbon atoms including the dimethyl, diethyl, dipropyl, dibutyl, etc. esters. The terms "polyhydric alcohol" and "saturated aliphatic polyhydric alcohol having at least three hydroxyl groups" include both polyhydric alcohols in which the hydroxyl groups are connected by a plurality of carbon to carbon linkages as well as other alcohols having more than three hydroxyl groups such as glycerin, 1,1,1-trimethylol ethane, sorbital, mannitol, diglycerol, dipentaerythritol, etc.

The term "equivalent percent" is employed in its usual sense herein, it being the number of equivalents of the reactant divided by the total number of equivalents of all reactants times one hundred. The number of equivalents of a reactant is the number of moles of the reactant multiplied by the number of functional groups such as carboxyl, ester, hydroxyl. etc. Thus the equivalents of dimethyl terephthalate is the number of moles of this material multiplied by two, for glycerin the number of moles times three, and for ethylene glycol the number of moles times two.

Typical of the polyesters, along with the others described in the above cited copending application, which can be used in the practice of the invention is one prepared from the following ingredients:

Dimethyl terephthalate __ 46 equiv. percent (3 moles)
Ethylene glycol _____ 31 equiv. percent (2 moles)
Glycerin (95%) _____ 23 equiv. percent (1 mole)

The above materials are added along with xylene or a similar solvent, to prevent sublimation of lower dialkyl esters of the acids, to a three-necked flask having a thermometer, stirrer and a Vigreux column with a Dean and Stark trap and funnel on the column. A nitrogen blanket is also provided for the system. The system is heated for about 30 minutes during which time the pot temperature rises to about 130° C. and the water and xylene azeotropically distill from the system. Then about 0.03 percent by weight of lead acetate as an alcoholysis catalyst based on the weight of the dimethyl terephthalate is added and heating continued for about three and one-half hours to a final temperature of about 240° C. Sufficient cresol is added to form a solution having a solids content of 37 percent by weight. Other solvents which can be used include the xylenols, polyhydroxy benzenes, xylene and the higher boiling petroleum hydrocarbons. It will be realized, of course, that other alcoholysis catalysts can be used such as lead oxides, zinc oxide, cadmium acetate, cuprous acetate, zinc acetate, etc.

The epoxy resins used as bonding material in conjunction with the invention are well known. They are described in Castan United States Patent Nos. 2,324,483 and 2,444,333, British Patent No. 518,057 and British Patent No. 579,698. Some of the epoxy resins described therein are the reaction product of an epihalogenohydrin such as epichlorohydrin and a phenol having at least two phenolic hydroxy groups such as bis-(4-hydroxy phenyl)-2,2-propane. United States Patents Nos. 2,494,295; 2,500,600 and 2,511,913 describe further epoxy resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

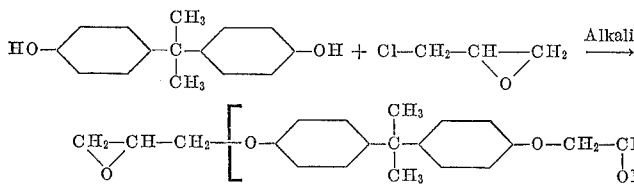

where $n$ has an average value ranging from 0 to 10. Such ethoxyline resins are sold under the name of Epon by Shell Chemical Corporation, under the name Araldite by the Ciba Company as Epi-Rez resins by Devoe-Raynolds Company and ERL resins by the Bakelite Company. The data given below for such resins is representative.

| Epoxy Resin | Epoxide Equivalent | M.P., 0° |
|---|---|---|
| Epon 828 | 192 | 9 |
| Epon 834 | 225-290 | 20-28 |
| Epon 1001 | 450-525 | 64-76 |
| Epon 1004 | 905-985 | 97-103 |
| Epon 1007 | 1,600-1,900 | 127-133 |
| Epon 1009 | 2,400-4,000 | 145-155 |
| Epon 1062 | 140-165 | Liquid |
| Epon 1064 | 300-375 | 40-45 |
| Araldite 6010 | 192 | Liquid |
| Araldite 6020 | 200-205 | Liquid |
| ERL-2774 | 175-200 | Liquid |
| Epi-Rez 510 | 175-200 | Liquid |

Examples of still other types of epoxide resins that may be used are epoxidized polyolefins. For example vinylcyclohexenedioxide and ERLA-0200 are sold by the Union Carbide Chemical Company and by the Bakelite Company.

Among the curing agents used for epoxy resins are polybasic acids or acid anhydrides as described in the above Patent 2,324,483. Pyromellitic dianhydride, used alone or in conjunction with other acids or anhydrides, such as maleic anhydride and the like, is also generally useful. The use of hexachloroendomethylenetetrahydrophthalic anhydride as an epoxy resin curing agent is described in Patent 2,744,845, assigned to the same assignee as this invention. The use of organic nitrogen or amine type materials to cure epoxy resins is also well known, as set forth, for example, in the above Patent 2,444,333.

Despite the large number of epoxy resin curing agents which are available, it has been found that for the present purpose, only boron trifluoride-organic base complex materials are suitable. The boron trifluoride-organic base complex materials used herein are well known in the art. They are conveniently prepared by adding to an ether solution of base amine, as desired, an ether solution of a boron trifluoride-ether complex. They can also be prepared by simply bubbling boron trifluoride gas through an ether solution of a base. Preferably alkyl ethers are used such as methyl, ethyl, propyl, butyl, etc. or mixed alkyl esters as well as aryl esters, ethers, alkaryl and aralkyl ethers. Among the amines which can be used are methyl amine, ethyl amine, propyl amine, butyl amine, aniline, diethyl aniline, toluidines, chloroaniline, nitroaniline, and piperidine. Also useful in the present invention are complexes prepared as above of boron trifluoride with materials such as phenol and etherate complexes alone as used in conjunction with the lactams. Other suitable ethers and base materials will occur to those skilled in the art. A $BF_3$-ethylamine complex material is commercially available from the Shell Chemical Company and is known as $BF_3$-400.

The adhesive or bonding material may be applied to the polyester enameled wire in any of the usual well-known manners. For example, the wire 1 coated with polyester 2 may be coated by passing it through a fluid epoxy material to provide a bonding coating 3. Alternatively, the wire may be coated by passing it over a roller which, in turn, has been coated or impregnated with the epoxy resin material. The coated wire is immediately passed on to the coil forms in well-known manner, and the coils are cured as in an oven at temperatures ranging from 150° C. to about 225° C. for times varying from one minute to about 3 hours. It will be realized, of course, that this curing cycle is of a time-temperature nature, lower temperatures being used for longer times and, conversely, shorter periods of time being required for the higher temperatures. Alternatively, of course, the bonding material may be cured in place by simply passing an electrical current through the coil to produce the necessary curing heat or using other well-known heat sources. A particular advantage of the coils of the present invention is that they may be either cured on the form or mandrel itself, or removed from the form and cured subsequently thereto.

The following examples and tests will point out the desirable features of the present invention. Copper wire of 15 gauge size coated with 3.4 mils of the polyester material described above was coated with respectively Epon 828, containing 2.9% by weight $BF_3$.400; Epon 815 containing 2.9% by weight $BF_3$.400; Epon 828 containing 16.4% by weight of pyromellitic dianhydride and 15.1% by weight of maleic anhydride; Araldite 6010 containing 41.6% by weight hexachloroendomethylenetetrahydrophthalic anhydride, and 11.7% by weight phthalic anhydride; and a solution of Epon 828 containing 27.3% by weight hexachloroendomethylenetetrahydrophthalic anhydride, 22.7% by weight Epon 828 and 50.0% by weight toluene. Twisted pairs of wires having each of the above combinations of coatings prepared according to NEMA Standard MW-24 and JAN-W-583 were prepared. Since in effect a precision-wound coil results in a sealed system, the above twisted pairs of wires were tested for compatibility of the bonding material and the polyester wire enamel by placing them in a gasketed bottle together with two straight pieces of each of the above types of wire, the bottle having been previously baked for four hours in a 180° C. oven, loaded hot and then sealed, after which the bottle was heated with its contents at a temperature of 180° C. for two weeks.

The twisted pairs of wires were tested according to the above specifications by placing a potential across the two conductors, the voltage being increased at a rate of 250 volts per second, until a finite current flowed through the insulation. The voltage determined by this method is referred to as the dielectric strength, volts (or volts/mil) for a twisted pair. The twisted pairs so tested had dielectric strengths as shown below in Table I.

TABLE I

*Sealed Bottle Compatibility Tests*

| Contents (parts by weight): | Dielectric strength, volts |
|---|---|
| Control (no bonding material) | 6600 |
| Epon 828, BF₃.400 (100:3) | 6950 |
| Epon 815, BF₃.400 (100:3) | 6200 |
| Epon 828, PMDA, MA (100:24:22) | 5008 |
| Araldite 6010, HET, PA (100:89:25) | 3440 |
| Epon 828, HET, toluene (100:89:25) | 2045 |

PMDA = pyromellitic dianhydride.
MA = maleic anhydride.
HET = hexachloroendomethylenetetrahydrophthalic anhydride.
PA = phthalic anhydride.

From the above, it will be at once apparent that the present bonding material consisting of epoxy resin having as a curing agent BF₃.400 when used in conjunction with the above polyester material is definitely superior to epoxy resins cured with other types of curing agents.

The shelf life or gel time of materials which are used to form electrical wires into coils is, of course, an important characteristic, since those materials with very short gel times or shelf life cannot be used from a practical point of view. Various combinations of epoxy resins as shown in Table II below were tested on a Sunshine gel time meter. This gel time meter operates with a rotating spindle suspended in the sample by a torsional spring and is driven by a synchronous motor which turns at one revolution per minute. When the gel time point has been reached, electrical contact is made by the spindles remaining stationary while the drive continues to turn, thus giving an indication of the time in which gelling occurs. In the table below, all tests took place at room temperature, except where otherwise indicated.

TABLE II

*Gel Times*

| Composition (parts by weight) | Temperature, ° C. | Time |
|---|---|---|
| Epon 828, PMDA, MA (100:24:22) | | 5 days. |
| Epon 828, HET anhydride (100:82) | | 250 minutes. |
| Epon 828, PMDA, PA (100:5:58) | | precipitated. |
| Epon 828, PMDA, PA (100:5:58) | 100 | Do. |
| Epon 834, PMDA, PA (100:4:44) | | Do. |
| Epon 834, PMDA, PA (100:4:44) | 85 | 381 minutes. |
| Epon 828, HET, PA (100:89:25) | | 120 minutes. |
| Epon 815, PMDA, MA (100:24:22) | | 6 days. |
| Epon 820, HET, PA (100:89:25) | | 1 day. |
| Epon 815, HET, PA (100:89:25) | | 27 hours. |
| Epon 820, PMDA, PA (100:5:58) | | 24 hours. |
| Epon 820, PMDA, MA (100:24:22) | | 8 days. |
| Epon 815, PMDA, PA (100:5:58) | | 13 days. |
| Epon 828, BF₃.400 (100:3) | | Did not gel in 58 days. |
| Epon 815, BF₃.400 (100:3) | | Did not gel in 34 days. |
| Epon 820, BF₃.400 (100:3) | | Did not gel in 35 days. |

From the above table, it will be at once apparent that the epoxy resins having as a curing agent BF₃.400 are much superior and more convenient to handle from the point of view of gelling time than the other epoxy resin-curing agent combinations shown.

A number of coils using the various bonding materials set forth in Table III below in the amounts shown were cycled between room temperature and 180° C.

TABLE III

*Temperature Cycling of Field Coils to 180° C.*

| Composition (parts by weight): | Dimensions (mm.) overall length |
|---|---|
| Epon 815, BF₃.400 (100:3) | |
| Before | 186 |
| After | 186 |
| Epon 828, BF₃.400 (100:3) | |
| Before | 184 |
| After | 184 |
| Epon 828, PMDA, MA (100:24:22) | |
| Before | 186 |
| After | 188 |
| Araldite 6010, PMDA, MA (100:24:22) | |
| Before | 178 |
| After | 180 |

From the above table, it will be noted that when BF₃.400 was used as the curing agent for epoxy resin, the overall length of the coil did not vary after the cycling test referred to above.

Since a mineral type or synthetic type oil is usually used on magnet wire, even though enameled, to facilitate the winding of coils with coil winding machinery, the compatibility of a bonding material for the enameled wire with such so-called spooling oils is of great importance, since it would be impractical or uneconomic to remove such spooling oil from the wire just before its formation into a coil, even if such a step were desirable. In order to determine the bonding strength of the present material to an enameled wire treated with a spooling oil, a series of tests were carried out wherein wire coated with the above polyester were treated in various manners as set forth below were cut into four-inch pieces which were butted together, a splint being formed over the butt joint with two 1½" long pieces of wire, all of 0.0605" diameter. The splints were then tied together with 0.005" diameter wire and the bonding material applied to the entire structure. After curing, the samples were pulled at 25° C. and 125° C. on a Baldwin tensile tester, five samples being used in each case. The results of such tests are set forth in Table IV below, the amounts of curing agent and epoxy resin being as set forth in the table.

TABLE IV

*Splint Tests*

| Composition (Parts by Weight) | Lubricant | Bond Strength Temperature | |
|---|---|---|---|
| | | 25° C. | 125° C. |
| | | p.s.i. | p.s.i. |
| Epon 828, PMDA, MA (100:24:22) | none | 95 | 78 |
| Epon 828, PMDA, MA (100:24:22) | mineral | 89 | 70 |
| Epon 828, PMDA, MA (100:24:22) | silicone | 89 | 73 |
| Epon 828, BF₃.400 (100:3) | none | 97 | 75 |
| Epon 828, BF₃.400 (100:3) | mineral | 95 | 75 |
| Epon 828, BF₃.400 (100:3) | silicone | 94 | 78 |

From the data shown in Table IV, it is quite apparent that when BF₃.400 complex material is used as a curing agent for the epoxy type bonding material, the bond strength to the spooling oil treated polyester enameled wire is quite superior to that when a pyromellitic dianhydride-maleic anhydride curing agent is used, such bond strength being practically that obtained when no spooling oil at all was used.

A special feature of this invention dwells in the fact that by proper temperature or other adjustment of the viscosity of the epoxy resin-curing agent combination, coils may be wound which have sufficient precure bonding material strength that the coils after being formed may be removed from the forming mandrel either with or without tie strings or temporary clamps and cured without forms. When using epoxy resins such as Epon 820, Epon 828, Araldite 6005, Araldite 6010, or Araldite 6020, generally along with about 3%, by weight, of $BF_3.400$ curing agent, coils may be formed on mandrels and removed therefrom for curing separate from the form by the use of tie strings or temporary clamps. On the other hand, when the epoxy resin-curing agent combination has a viscosity of greater than about 40,000 centipoises at 25° C., coils may be formed and removed from the mandrel for curing without the benefit of any tying strings or form maintaining appliances whatsoever. Epoxy resins such as Epon 834 and Araldite 6040, either alone or in mixtures, along with other similar epoxy resins, may be used in this connection. Such compositions are generally applied at a temperature of about 40° C. to 50° C., the upper limit of the viscosity range being governed by the temperature required to lower the viscosity enough to enable easy application. Tests have shown that temperatures above about 50° C. shorten the pot life of the material excessively.

There was applied to an enameled wire having as the enamel the polyester set forth above a bonding material at a temperature of 40° C. consisting of 540 parts by weight of Araldite 6040, 360 parts by weight of Araldite 6020, and 27 parts by weight of $BF_3.400$ curing agent. Coils so formed were readily removed from the forming mandrel without becoming distorted in any manner, such coils being then placed in a curing oven for curing of the bonding material without any shape retaining appliances of any kind. Further, a mixture of, by weight, 120 parts Araldite 6040, 30 parts Araldite 6060, and 4.5 parts $BF_3.400$ was similarly used as a bonding material in forming coils with the above enameled wire at a temperature of 45° C. Again, coils so formed were readily removed from the mandrel and cured without losing their shape or becoming distorted in any manner.

Still another epoxy resin bonding combination consisting of, by weight, 50 parts of Araldite 6040, 50 parts Araldite 6020, and 3 parts $BF_3.400$ was applied to the enameled wire at a temperature of about 40° C. Coils formed from wire so treated were easily removed from the forming mandrel and cured without supporting devices of any kind. The coils resulting from wet winding with a solventless epoxy resin having as a curing agent $BF_3$-amine complex material in the manner described are completely impregnated, thus eliminating the costly and time-consuming impregnating steps involving vacuum treating techniques. The resulting solid structure provides excellent heat transfer, since there are no voids or gas pockets within the structure. Furthermore, as pointed out above, the coils may be prepared from such materials without the need of curing while still on the mandrels or forms.

What I claim as new and desire to secure by Letters Patent of the United States is:

1. An electrical conductor coated with a polyester material comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to about 44 equivalent percent saturated aliphatic polyhydric alcohol having at least three hydroxyl groups, said polyester having thereon a coating of a $BF_3$ amine complex cured epoxy resin.

2. An electrical conductor coated with a polyester material comprising (1) from about 36 to 50 equivalent percent of a lower dialkyl ester of a member selected from the class consisting of isophthalic acid and terephthalic acid and mixtures thereof, (2) from about 25 to about 40 equivalent percent of ethylene glycol, and (3) from about 20 to about 32 equivalent percent saturated aliphatic polyhydric alcohol having at least three hydroxyl groups, said polyester having thereon a coating of a $BF_3$ amine complex cured epoxy resin.

3. An electrical conductor coated with a polyester comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to about 44 equivalent percent saturated aliphatic polyhydric alcohol having at least three hydroxyl groups, said polyester having thereon an overcoating of a $BF_3$ amine complex cured epoxy resin, said epoxy resin having a viscosity of at least 40,000 centipoises at 25° C.

4. A composite enamel for electrical conductors comprising successive layers of a polyester comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to about 44 equivalent percent saturated aliphatic polyhydric alcohol having at least three hydroxyl groups, said polyester having thereon a coating of a $BF_3$ amine complex cured epoxy resin.

5. The method of insulating electrical conductors which comprises coating said conductors with a polyester resin comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to about 44 equivalent percent saturated aliphatic polyhydric alcohol having at least three hydroxyl groups, and in turn coating said polyester resin with a $BF_3$ amine complex curable epoxy resin.

6. A self-supporting electrical coil fabricated from at least one electrical conductor, said electrical conductor having a composite coating comprising a polyester comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to about 44 equivalent percent saturated aliphatic polyhydric alcohol having at least three hydroxyl groups, said polyester having an overcoating of a $BF_3$ amine complex cured epoxy resin, said epoxy resin having an uncured viscosity of at least 40,000 centipoises at 25° C.

7. A method of making a self-supporting electrical coil which comprises winding said coil from an electrical conductor coated with a polyester comprising (1) from about 25 to 56 equivalent percent of a lower dialkyl ester of a member selected from the class consisting of isophthalic acid and terephthalic acid and mixtures thereof, (2) from about 15 to about 46 equivalent percent of ethylene glycol, and (3) from about 13 to 44 equivalent percent saturated aliphatic polyhydric alcohol having at least three hydroxyl groups, said polyester having an overcoating of a $BF_3$ amine complex curable epoxy resin, said epoxy resin having a viscosity of greater than 40,000 centipoises at 25° C., said electrical conductor and its coating being at a temperature of from about 40° C. to 50° C. during the winding of said coil.

References Cited in the file of this patent

UNITED STATES PATENTS

| | | |
|---|---|---|
| 2,626,223 | Sattler | Jan. 20, 1953 |
| 2,686,739 | Kohl | Aug. 17, 1954 |
| 2,686,740 | Goodwin | Aug. 17, 1954 |
| 2,847,343 | Kohn | Aug. 12, 1958 |
| 2,889,304 | Sheffer et al. | June 2, 1959 |
| 2,936,296 | Precopio et al. | May 10, 1960 |